(12) United States Patent
Pitkethly

(10) Patent No.: US 8,838,665 B2
(45) Date of Patent: *Sep. 16, 2014

(54) FAST CONDITION CODE GENERATION FOR ARITHMETIC LOGIC UNIT

(75) Inventor: Scott Pitkethly, San Francisco, CA (US)

(73) Assignee: Nvidia Corporation, Santa Clara, CA (US)

( * ) Notice: Subject to any disclaimer, the term of this patent is extended or adjusted under 35 U.S.C. 154(b) by 283 days.

This patent is subject to a terminal disclaimer.

(21) Appl. No.: 13/296,087

(22) Filed: Nov. 14, 2011

(65) Prior Publication Data

US 2013/0080491 A1 Mar. 28, 2013

Related U.S. Application Data

(63) Continuation of application No. 13/247,796, filed on Sep. 28, 2011.

(51) Int. Cl.
*G06F 7/00* (2006.01)
*G06F 9/30* (2006.01)
*G06F 7/48* (2006.01)

(52) U.S. Cl.
CPC .. *G06F 7/00* (2013.01); *G06F 9/30* (2013.01); *G06F 7/48* (2013.01)
USPC .......................................................... 708/525

(58) Field of Classification Search
None
See application file for complete search history.

(56) References Cited

U.S. PATENT DOCUMENTS

| 5,262,973 | A | * | 11/1993 | Richardson | 708/525 |
|---|---|---|---|---|---|
| 5,422,805 | A | * | 6/1995 | McIntyre et al. | 708/625 |
| 5,586,069 | A | * | 12/1996 | Dockser | 708/525 |
| 5,604,689 | A | * | 2/1997 | Dockser | 708/200 |
| 5,615,113 | A | * | 3/1997 | Matula | 708/655 |
| 5,638,312 | A | * | 6/1997 | Simone | 708/525 |
| 5,748,515 | A | * | 5/1998 | Glass et al. | 708/525 |
| 6,009,451 | A | * | 12/1999 | Burns | 708/525 |
| 6,173,303 | B1 | * | 1/2001 | Avigdor et al. | 708/620 |
| 8,352,530 | B2 | * | 1/2013 | Dao et al. | 708/491 |
| 2007/0130242 | A1 | * | 6/2007 | Tajiri | 708/525 |
| 2013/0080491 | A1 | * | 3/2013 | Pitkethly | 708/211 |
| 2013/0080740 | A1 | * | 3/2013 | Gentle et al. | 712/205 |

* cited by examiner

*Primary Examiner* — David H Malzahn

(57) ABSTRACT

In one embodiment, a microprocessor includes fetch logic for retrieving an instruction, decode logic configured to identify a plurality of operands and a multiply operation specified in the instruction, and execution logic configured to receive the plurality of operands and the multiply operation. The execution logic includes a first logic path configured to perform the multiply operation on the plurality of operands and output a result, and a second logic path, arranged in parallel with the first logic path, configured to output metadata associated with the result of the multiply operation.

10 Claims, 9 Drawing Sheets

FAST CONDITION CODE GENERATION FOR ARITHMETIC LOGIC UNIT

CROSS REFERENCE TO RELATED APPLICATIONS

The present application is a continuation of U.S. patent application Ser. No. 13/247,796 filed Sep. 28, 2011, titled "Fast Condition Code Generation for Arithmetic Logic Unit", the entire contents of which are incorporated herein by reference for all purposes.

BACKGROUND

Modern microprocessors and other digital devices can carry out an extremely large number of operations in a short amount of time (e.g., millions or billions of microprocessor instructions per second). A significant number of these operations are arithmetic, for example adding, subtracting, multiplying, dividing, incrementing, decrementing, etc. Program execution is of course governed by the results of these operations, though in many cases the information of interest is not the primary result (e.g., the sum output of an add operation) itself, but rather a characteristic of the primary result, the characteristic being variously and alternately referred to herein as side effects, flags, metadata, conditions, etc. For example, instruction branching is often predicated on whether or not a primary result has a value of zero, or whether the primary result involves a carry or overflow. Increasing the speed of arithmetic operations is always of concern, but in many cases it is equally important to quickly determine these so-called "side effects," such as whether the result is zero, involves a carry or overflow, etc. These characteristics are commonly noted by setting flags. For example, in an arithmetic logic unit (ALU), flags are commonly set to indicate whether the result of an ALU operation was negative (N) or zero (Z) or resulted in a carry (C) or an overflow (V).

Processor performance in many settings is constrained by the speed at which the above-referenced flags are generated. Typical implementations involve a serial process in which the primary result is first calculated; and the primary result is then sent through additional downstream logic to determine the various flags of interest.

SUMMARY

In one embodiment, a microprocessor includes fetch logic for retrieving an instruction, decode logic configured to identify a plurality of operands and a multiply operation specified in the instruction, and execution logic configured to receive the plurality of operands and the multiply operation. The execution logic includes a first logic path configured to perform the multiply operation on the plurality of operands and output a result, and a second logic path, arranged in parallel with the first logic path, configured to output metadata associated with the result of the multiply operation. In some embodiments, the secondary logic path is configured (1) to have fewer logic stages than the primary logic path; (2) to have a lower latency than the primary logic path; (3) to output the metadata associated with the result of the multiply operation at least as early as the first logic path produces the result.

By providing the operands to the first and the second logic paths of the execution unit, both logic paths can perform operations at the same time, and as indicated above the characteristic can be determined at least as early as the primary result is generated, thereby allowing actions based on the characteristic determination to be performed earlier than would otherwise be possible.

DETAILED DESCRIPTION

The present discussion sets forth novel microprocessor architectures and methods that can significantly speed up the generation of flags. These flags may be additionally or alternatively referred to as metadata, characteristics, conditions, and/or side-effects of a primary result of an arithmetic operation. Such metadata may in fact be the information that is of primary interest, such that in many cases the primary result of a calculation is not needed or desired to continue program execution.

In many implementations, parallel execution is performed so that a flag/metadata/characteristic is available at the same time or earlier than the primary result itself. Many embodiments entail use of a second logic path in addition to the primary path which calculates the primary result of the operation. The second path is configured to provide metadata determination with latency equal to or less than the primary path, typically through use of simpler logic and/or a logic path having fewer stages. When the operands are supplied to this second logic path early enough, the side effect calculation occurs at least as fast as the primary result calculation performed by the primary path. Accordingly, the side effect value (flag) is available for consumption at the same time as, or earlier than the primary result, such as on the next clock cycle. In other embodiments, the main path may be disabled if the primary interest is the value of the flag. Such disabling can in some cases reduce power consumption and otherwise enhance performance.

Figure 1:
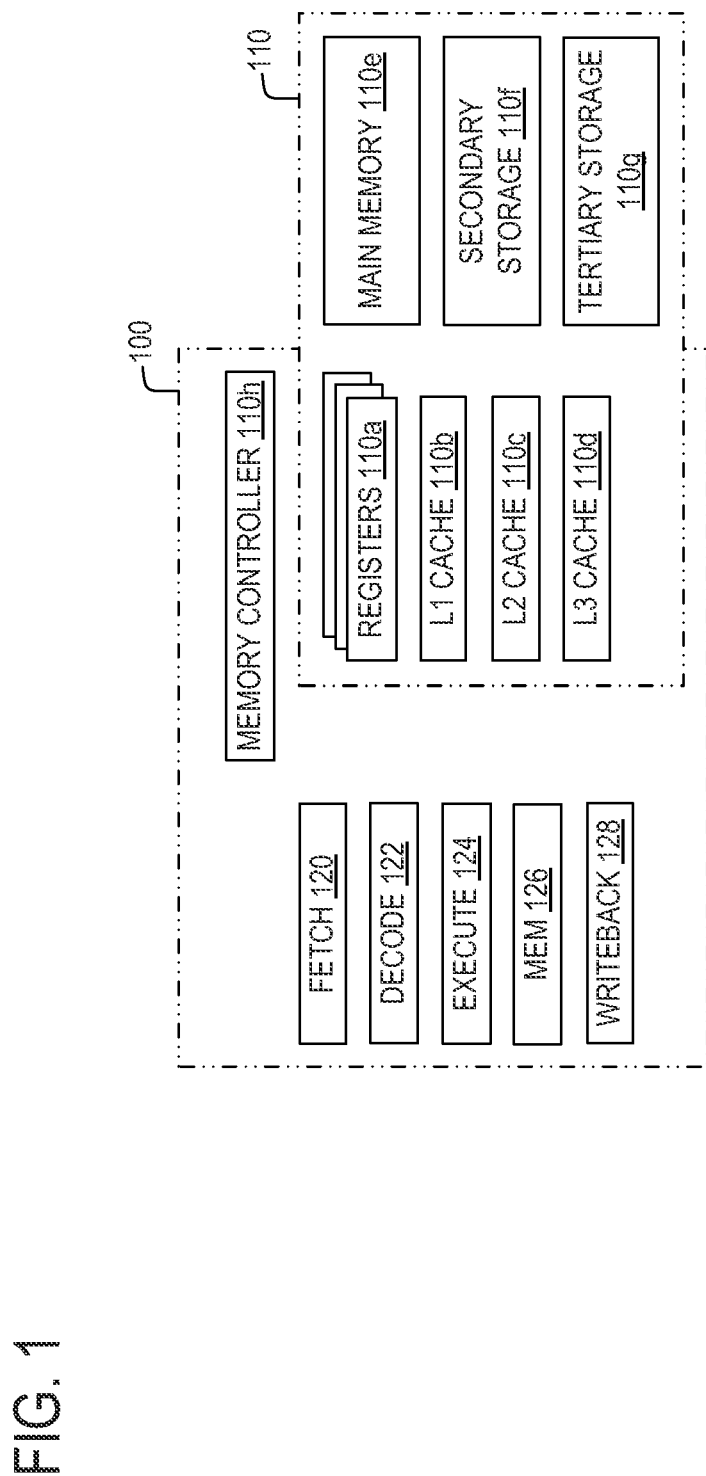
FIG. 1 shows an embodiment of a microprocessor of a computing device according to the present disclosure.

FIG. 1 schematically depicts a microprocessor 100 that may be employed in connection with the systems and methods described herein. In particular, the exemplary microprocessor may be configured to optimize and speed up the process by which flags are generated. Microprocessor 100 variously includes and/or may communicate with a memory hierarchy 110, which may include processor registers 110*a*, an L1 processor cache 110*b*, an L2 processor cache 110*c*, an L3 processor cache 110d, main memory 110e (e.g., one or more DRAM chips), secondary storage 110f (e.g., magnetic and/or optical storage units) and/or tertiary storage 110g (e.g., a tape farm). It will be understood that these memory/storage components are listed in increasing order of access time and capacity, though there are possible exceptions. A memory controller 110h may be used to handle the protocol and provide the signal interface required of main memory 110e and typically to schedule memory accesses. The memory controller can be implemented on the processor die or on a separate die. It is to be understood that the memory hierarchy provided above is non-limiting and other memory hierarchies may be used without departing from the scope of this disclosure. The depicted memory hierarchy is an exemplary illustration, and it will be understood that other hierarchies may be employed without departing from the spirit of the present disclosure.

Microprocessor 100 is configured to execute instructions that generally are described and defined by a given instruction set architecture (ISA). Regardless of the particular ISA, the described optimizations that provide fast flag generation may be employed in connection with any type of execution unit. Continuing with FIG. 1, microprocessor 100 may execute various instruction set architectures, which may be characterized as complex instruction sets (CISC architecture), reduced instruction sets (RISC architecture), and very long instruction word architectures (VLIW). Further it is possible that a given instruction set may have characteristics associated with more than one of these regimes. In addition, some instruction sets that are thought of as CISC implementations may in fact be executed on microprocessor 100 in a RISC-like fashion. For example, the widely employed ×86 architecture, though considered a CISC system, is often implemented in a manner that is more associated with a pipelined RISC implementation. Again, regardless of the particular ISA or its characteristics, the present disclosure provides a way of generating result metadata at least as early as the actual primary result is calculated.

Instantiation of code as a series of processor-recognized instructions (i.e., ISA instructions) may entail compiling code of an operating system, application, driver, etc. to produce binary code that is executed by microprocessor 100. During compilation or post-processing operations, very long instruction word (VLIW) and code-morphing techniques may be employed to effect various optimizations. In some cases, these software optimizations are employed so that the microprocessor can execute instructions in program order without the need for the complex hazard detection and avoidance/mitigation hardware that are present in many CISC and RISC execution pipelines. That said, in some cases decode and execution logic may be employed to perform dynamic optimization and hazard avoidance in lieu of or in addition to VLIW and code-morphing optimization.

Microprocessor 100 includes fetch logic 120, decode logic 122, execution logic 124, mem logic 126, and writeback logic 128. Fetch logic 120 retrieves instructions from the memory hierarchy 110 (typically from either unified or dedicated L1 caches backed by L2-L3 caches and main memory). Decode logic 122 decodes the instructions, for example by parsing opcodes, operands, and addressing modes. Upon being parsed, the instructions are then executed by execution logic 124. For operations that produce a primary result (for example, as opposed to those that perform a branch to another location in the executing program), writeback logic 128 writes the result to an appropriate location, such as a processor register. In load/store architectures, mem logic 126 performs load and store operations, such as loading an operand from main memory into a processor register. Decode logic interprets the nature of the instruction, and then dispatches the instruction to a particular execution unit, which may include or implement the fast flag generation systems and methods described herein.

It should be understood that the above five stages are somewhat specific to and included in a typical RISC implementation. More generally a microprocessor may include fetch, decode, and execution logic, with mem and write back functionality being carried out by the execution logic. The present disclosure is equally applicable to these and other microprocessor implementations.

In the described examples, instructions may be fetched and executed one at a time, possibly requiring multiple clock cycles. During this time, significant parts of the data path may be unused. In addition to or instead of single instruction fetching, pre-fetch methods may be used to improve performance and avoid latency bottlenecks associated with read and store operations (i.e., the reading of instructions and loading such instructions into processor registers and/or execution queues).

Figure 2:
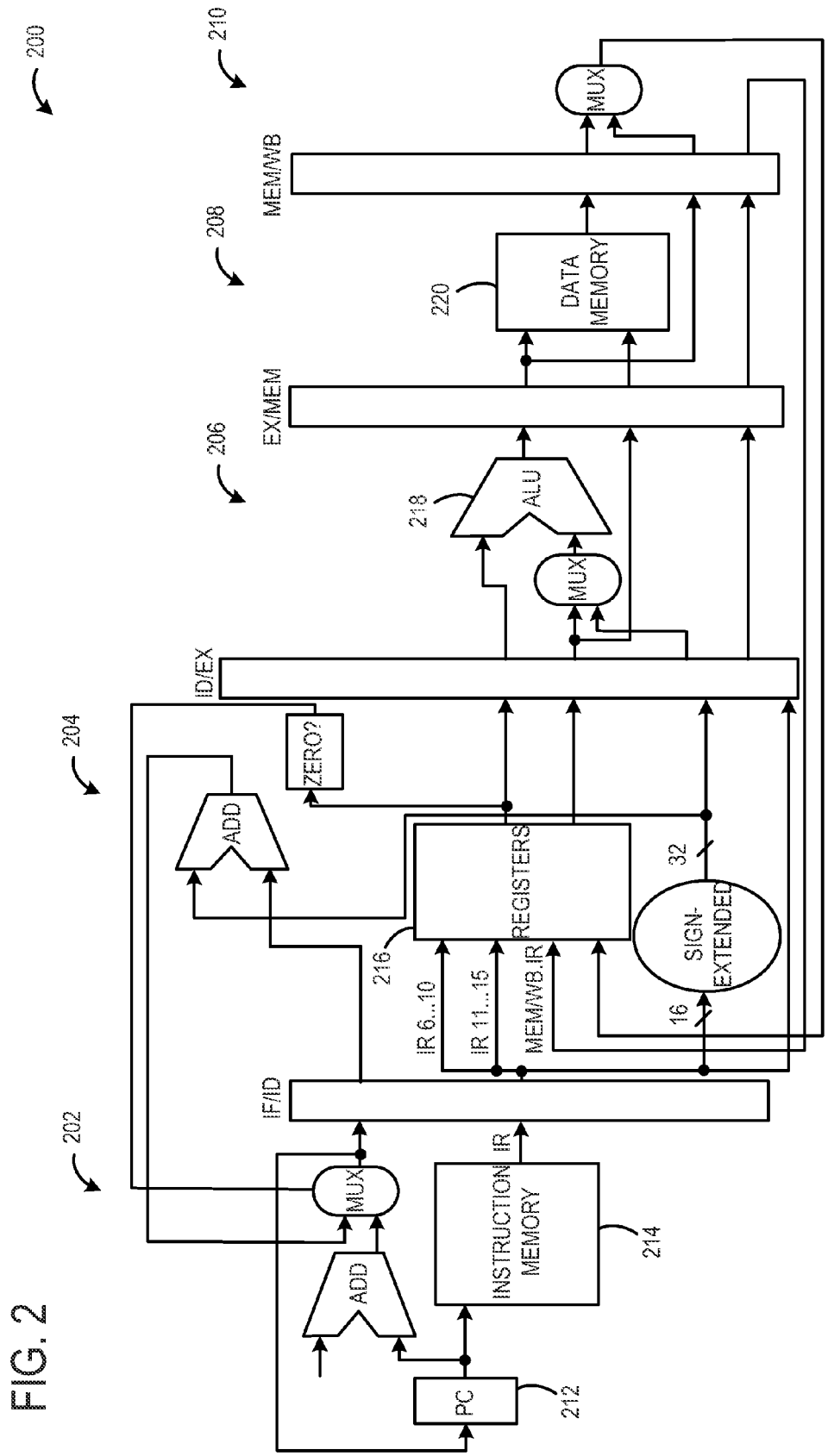
FIG. 2 shows an embodiment of a computer processing pipeline according to the present disclosure.

To achieve higher performance, the exemplary microprocessors may be pipelined to exploit instruction level parallelism and better utilize the data path so that there are multiple instructions in different stages of execution at the same time. FIG. 2 shows an embodiment of a RISC implemented processing pipeline 200 according to the present description.

For example, the processing pipeline 200 includes five stages:

Instruction fetch (IF) 202
Instruction decode (ID) 204
Execute (EX) 206
Memory (MEM) 208
Writeback (WB) 210

In the IF stage 202 fetch logic including a current program counter (PC) 212 is used to retrieve the next instruction from instruction memory 214. Concurrently the PC 212 is incremented to point to the next sequential instruction. In the ID stage 204 the previously fetched instruction is decoded and register source operands are read from decode logic including a register file 216. In the EX stage 206, execution logic including an arithmetic logic unit (ALU) 218 is used to either compute a result (e.g. for an "ADD" instruction), calculate the effective address for a memory operation (e.g. a "LOAD" or "STORE"), or calculate a branch target address (e.g. for a "branch" instruction) where the processing pipeline 200 should fetch its next instruction if a branch is taken. It should be understood that the illustrated embodiment is a schematic representation of one example implementation of the ALU 218 and multiple execution logic units may be employed, including duplicate units providing identical functionality (e.g., multiple adders).

The present description will use the term ALU to encompass any arithmetic logic unit (ALU) or execution unit capable of performing arithmetic, and more particularly integer arithmetic. These may be general purpose ALUs or more narrowly focused execution units capable of performing only addition, or multiplication, or incrementing by a fixed constant (e.g., increment by one).

The discussion will also use the term flag to encompass any condition code, flag, predicate register, or other indicator that is used to indicate some property or condition of the result of an ALU operation. Further, as indicated above, such flags may be indicative of result metadata, execution side effects, result characteristics, etc. Such flags, characteristics, metadata, etc. may include an indication that an ALU primary result is zero, is negative, resulted in a carry, or resulted in an overflow. In another example, a flag may indicate a condition where a result is "undefined". For example, if an operation is performed to find the first "1" in an operand, but the operand is all zeros, then flags can be set to indicate this undefined condition.

In the MEM stage 208 load and store instructions access the data memory (or caches) 220. During the WB stage 210 any instructions with a register destination operand (e.g. "ADD" or "STORE") write their result to the register file 216. Thus, one instruction might be writing results back to an internal register while another instruction is reading or writing data, the instruction immediately following is performing an ALU operation, and the instruction following that is retrieving register operands while still another instruction is being fetched.

Ideally, in the processing pipeline 200 an instruction will complete and a new instruction will be fetched every clock cycle. Moreover, superscalar implementations are possible that retire more than one instruction per clock cycle. However, pipelining introduces the possibility that the instructions in the pipeline may interact with each other in ways not possible in non-pipelined architectures, resulting in hazards. For example, an instruction may require the result of an earlier instruction. In a non-pipelined architecture the prior instruction would complete before the subsequent (dependent) instruction begins execution. However, in a pipelined architecture both instructions may be in the pipeline and the subsequent instruction may require the operand before the earlier instruction has produced it. This data dependence can result in a potential hazard.

An example using the processing pipeline 200 described above would be the sequence depicted below:

ADD $R1, R2, R3; R1 \leftarrow R2+R3$

SUB $R4, R1, R5; R4 \leftarrow R1-R5$

In this example, the contents of register R1 are needed by the SUB instruction. Normally this register would be read during a third clock cycle when the SUB instruction is in the ID stage 204. However, the preceding ADD instruction that produces it will be in the EX stage 206 at that time and the result will not be written to the register file until two more clock cycles when the ADD instruction reaches the WB stage 210. If the SUB instruction is allowed to proceed it will read the incorrect value for R1 from the register file.

To avoid this hazard as well as other hazards, pipelined processors typically employ hardware to detect potential hazards and mitigate them. A dependent instruction must either be stalled (retained in its present stage at the next clock cycle) while the instructions ahead of it are permitted to proceed, or the result from the earlier instruction must be forwarded from the stage where it was produced to the stage where it is required by the subsequent instruction. When a processor stalls, no further instructions are fetched. Stalls degrade performance because there will be clock cycles during which no instructions complete. In the example above, the SUB instruction will be stalled in the ID stage (and no further instructions fetched) for two cycles until the preceding ADD instruction reaches the WB stage and the sum of R2+R3 is written to register R1. Thus there will be two clock cycles when no instructions complete.

To reduce stalls due to these data dependences, in one example, additional data paths and control logic can be added to allow the result of the ALU 218 to be forwarded to an input of the ALU 218 so that the computed value of R2+R3 is available to the following instruction immediately, bypassing the need to read it from the register file.

Even with forwarding/bypassing, stalls may still be required to correctly handle some instruction sequences. For example, consider the following sequence of instructions:

LOAD $R1, 0(R2); R1 \leftarrow MEM[R2]$

SUB $R4, R1, R5; R4 \leftarrow R1-R5$

Even with a cache and data forwarding, the result of the "LOAD" instruction will not be available until the end of a fourth clock cycle while the subtract instruction requires the result at the beginning of the fourth clock cycle. Thus, the subtract instruction must be stalled for one cycle, otherwise the result with be inaccurate.

Control hazards may arise when a conditional jump or branch instruction is encountered. A conditional jump or branch instruction determines which of two or more execution paths should be taken based upon some condition. Typical branches are two-way: if the condition is satisfied then the branch is said to be "taken" and the next instruction is fetched from the specified target address. If the condition is not satisfied then the branch is said to be "not-taken" and the next instruction is fetched sequentially. The next instruction cannot be executed until the outcome of the branch (taken or not-taken) is known, which in turn relies on availability of the condition to be tested. Again, the present disclosure is directed to numerous embodiments and method implementations that lead to faster realization of execution metadata. In the case of branch testing, such faster flag generation can lead to more efficient and rapid branch decisions. Accordingly, the likelihood of stalling hazards in the processing pipeline can be reduced.

Without appropriate optimization, the processor stalls, not fetching additional instructions until the branch outcome is known, negatively impacting processor performance. This branch penalty can be significant depending upon the frequency of branch instructions and the number of stall cycles required to determine the branch outcome.

Techniques such as branch prediction and speculative execution may be employed to avoid these stalls by predicting the outcome of the branch and fetching instructions from the predicted path while the branch outcome is being determined If the prediction is later found to have been correct, the performance impact of a stall is avoided. However, incorrect predictions can result in fetching and processing numerous (incorrectly) speculatively executed instructions. The effects of these instructions must be undone or prohibited from committing, which in turn can degrade performance, particularly in longer pipelines. The flag generation methods described herein may in some cases avoid dependencies, but regardless of whether a dependency slows processing, the disclosed flag generation methods produce faster generation of result metadata. The rapid generation of metadata can provide a host of advantages, and a great many of these advantages are not limited to the branching context.

In more complex processing pipelines other hazards may arise which require additional techniques such as register renaming to avoid unnecessary stalls in the pipeline. Example implementations of such complex processing pipelines that may be employed according to the present description and associated hazards are described.

The simple scalar pipelining scheme described above with regard to FIG. 2 exploits instruction level parallelism and in the absence of stalls allows one instruction to be fetched while another instruction completes each clock cycle. To further improve performance, and as alluded to above, a superscalar pipeline may be used to fetch multiple instructions each clock cycle and issue them to parallel execution units in the pipeline. This permits more than one instruction to complete each clock cycle. In addition, as described herein, the operation of execution units can be dramatically improved through use of parallel logic paths that rapidly generate metadata.

Added to the complexity of detecting hazards arising from interactions between instructions just fetched and those already in the pipeline, superscalar architectures introduce the possibility of interactions among those instructions fetched together. For example, if the earlier of two instructions fetched together is a conditional branch instruction, the second instruction may not be executed. Additional hardware is required to detect and mitigate these dependencies. Some superscalar processors permit out-of-order execution and employ dynamic scheduling to alter the order in which instructions are issued to reduce stalls while preserving correct program behavior.

Like superscalar processors, very long instruction word (VLIW) processors also have multiple functional units capable of operating in parallel and thus completing more than one operation each clock cycle. However, rather than fetching multiple independent instructions and dynamically scheduling them, a VLIW explicitly combines multiple operations into a single long instruction (sometimes called a MultiOp) and issues them in parallel to the functional units.

Instead of dynamic scheduling, VLIW instructions are statically scheduled by the compiler or a post-processor to ensure that there are no hazards among the operations and to account for the latency of the execution units to reduce stalls. Because they are typically not dynamically scheduled and do not employ out-of-order execution, VLIW architectures can avoid complex hazard detection, resulting in simpler processors requiring less complexity and die area. However, it should again be noted that decode logic may still be employed to provide dynamic hazard detection and avoidance, even in VLIW implementations.

To continue with a VLIW example, if two instructions require different functional units and neither depends upon the result produced by the other, they can be scheduled to execute in parallel, by combining them in the same long instruction word. If one instruction depends upon the result produced by another, the scheduler can take into account the latency of the functional unit producing the result and schedule the dependent instruction so that the result of the earlier instruction is available to the dependent instruction during the cycle when it is scheduled to execute. Further, when other instructions depend on result flags, the present examples can significantly improve performance.

Consider the following sequence:

ADD $R1,R2,R3$; $R1 \leftarrow R2+R3$

STORE $R1,0$ $(R4)$; MEM$[R4] \leftarrow R1$

Because the ADD and STORE instructions can be handled by different execution units (integer ALU and load/store respectively) they could be packaged into the same MultiOp. However, the store requires the result of the ADD instruction (or perhaps metadata/characteristics of the ADD instruction result. On the other hand, a static scheduler could find another instruction, not dependent upon R1, to package into the MultiOp along with the ADD instruction and schedule the STORE of R1 into a subsequent MultiOp, taking into account the latency of the integer ALU execution unit to determine when the value of R1 will be available. Ideally, all instruction slots in a MultiOp are occupied as this exploits the parallelism of the multiple execution units and results in denser object code requiring fewer instruction fetches from memory. Latency is further reduced in cases where the flag is of primary interest.

Scheduling memory operations, particularly loads, is challenging because the latency cannot be known in advance. For example, the data could be found in an L1 or L2 cache or might require a memory operation with much longer latency.

When considering instructions to schedule or combine into MultiOps, the control flow of the program should also be considered. For example, consider two instructions: one just prior to and one immediately following a conditional branch. Because the outcome of the branch is not known at the time the MultiOps are constructed, the second instruction generally cannot be combined into the same MultiOp as the first. This can lead to unused instruction slots in a MultiOp and consequently an idle execution unit. This results in underutilized processor resources and less dense object code that requires more memory accesses.

Because of the greater parallelism possible in both superscalar and VLIW architectures, the importance of avoiding stalls due to branches is even greater than with simple scalar processors. High performance superscalar processors use branch prediction with speculative execution. Other techniques are often used for VLIWs and other processors not using speculative execution. When a stall occurs the processor forgoes fetching multiple instructions and when a branch is incorrectly predicted more instructions are incorrectly speculatively executed.

Instruction set architectures (ISAs) may implement branches in several ways. Many complex instruction set computers (CISCs) employ condition codes or flags that are set as a side effect of many ALU operations. Flags are commonly set to indicate whether the result of the ALU operation was negative (N) or zero (Z) or resulted in a carry (C) or an overflow (V). These condition codes or flags are implemented as additional bits of processor state. Conditional jump or branch instructions are able to test these flags to determine whether or not to branch to a target address or continue execution with the next sequential instruction. Examples might include JZ—jump (branch) if the last ALU result was equal to zero (that is if the Z flag was set).

Reduced instruction set computers (RISCs) often do not implicitly set condition codes as a result of most ALU operations. Some use simpler branch instructions that merely compare two registers. For example, BEQ or BNE for "branch if equal" and "branch if not equal". One register (e.g., R0) can either be permanently fixed to zero or an arbitrary register can be loaded with zero to perform a compare against zero. For more complicated branches, a combination of two instructions can be used: SLT R1,R2,R3 which sets register R1 to 1 if R2 is less than R3, followed by a conditional branch (BEQ or BNE) comparing R1 to zero.

Some ISAs use a compare instruction (CMP) which effectively does a subtract operation (without storing the result) to set condition codes. The condition codes can then be used by conditional jump or branch instructions that branch if the indicated condition code is set (or clear).

Consider, for example, the following C program fragment:

if $(A=B)$ $C=C+1$ else $D=D+1$ and the code a compiler generates for it assuming the variables A, B, C, and D are stored in registers R1, R2, R3, and R4 respectively:

```
        CMP R1, R2;         compare
        BEQ L1;             if equal go to L1    (is A == B?)
        ADD R4, R4, #1;     R4 ← R4 + 1          (no: increment D)
        BR L2;              Go to L2
    L1: ADD R3, R3, #1;     R3 ← R3 + 1          (yes: increment C)
    L2: <next instruction>
```

The compare instruction (CMP) does a comparison and sets flags or predicate registers to indicate the result of the comparison. Typically, these compare instructions include flags to indicate that the result of the comparison was less than, equal to, or greater than. The branch instruction (BEQ) following the compare instruction (CMP) tests the "equal to" condition code set by the compare instruction and either allows the next instruction to execute, adding 1 to register R4, or branching to the instruction that adds 1 to register R3. Note that the CMP instruction is in essence just a subtract operation using the ALU.

Condition codes (flags) can be set depending upon whether the result of the subtraction is positive, negative, zero, or resulted in an overflow. Predicate registers can be set indicating that one of the operands of the CMP instruction was either equal to, less than, less than or equal to, greater than, or greater than or equal to the other operand.

Some ISAs support predicated instructions. These are typically regular instructions but they can optionally be specified to be conditionally executed depending upon the value of a predicate register (similar to a condition code) that is set by a preceding compare (CMP) instruction. Rather than use a branch instruction and delay until the outcome of the branch is known, a predicated instruction can be scheduled and executed but its result inhibited if the predicate is subsequently determined to be false.

In the preceding example, neither of the two ADD instructions can be executed until the result of the comparison is known and the branch instruction executed. However, if predicated ADD instructions are used, they can be scheduled and executed. The branch (BEQ) instruction is eliminated and the CMP instruction compares R1 and R2 and sets or clears one or more predicate registers depending upon the result of the comparison. The ADD instructions are predicated, meaning they are allowed to execute but check the specified predicate register before completing the operation to see if they are permitted to write their result. Example predicates include "not equal", "equal", "greater than", "less than", "greater than or equal", and "less than or equal".

In the example code below for the C code in the earlier example, the ADDNE is an ADD instruction using the NE (not equal) predicate while the ADDEQ is an ADD instruction using the EQ (equal) predicate. They could be implemented by checking a single predicate register that is set by the CMP instruction if R1 and R2 are equal and cleared otherwise.

```
    CMP R1, R2;         compare
    ADDNE R4, R4, #1;   R4 ← R4 + 1    (no: increment d)
    ADDEQ R3, R3, #1;   R3 ← R3 + 1    (yes: increment c)
```

It will be appreciated here that both ADD instructions can be scheduled and executed, possibly in parallel.

Using the example processing pipeline 200 described above with reference to FIG. 2, the ADD instructions could proceed from the IF stage 202 through the MEM stage 208 before needing to check the predicate register in the WB stage 210. In the WB stage 210, if the predicate register did not match the specified condition, the write operation of the register (e.g., R4 in the case of the ADDNE and R3 in the case of the ADDEQ) would be delayed or inaccurate. This eliminates the branch instruction and permits the ADD instructions to proceed without stalling provided the CMP instruction has done the comparison and set the predicate registers before the predicated instructions reach their WB stage 210.

In a VLIW implementation there may be more flexibility in placing the predicated ADD instructions in MultiOps. In fact, the two instructions could be placed in the same MultiOp. In a VLIW or superscalar processor this could allow instructions from both paths of a branch to be scheduled concurrently, making more optimal use of processor resources and avoiding stalls.

In branch and predicated instruction settings, rapid flag generation can reduce latency and otherwise improve performance. Branch instructions could proceed to check the condition codes before the ALU operation completed. Likewise, if predicated instructions were used, the predicate registers could be set and the predicated instructions completed without waiting for the ALU result.

Traditionally flags are set by the ALU after the result is computed, typically by sending the result to downstream logic stages configured to detect result characteristics. For example, a result once calculated may be checked in a serially-subsequent operation to see if it is positive, negative, or equal to zero and the condition codes (flags) or predicate registers set accordingly. Any operation relying on the condition codes (flags) or predicate registers (e.g., a branch instruction or the hardware to inhibit the writing of a destination register in a predicated instruction) incurs the sum of the delay of the ALU to compute the result and the delay of the logic to perform the appropriate test on the result and set the condition codes (flags) or predicate registers.

While CMP instructions commonly use the ALU to perform a subtraction operation, subtraction is simply an addition of a number's negative: A−B is equal to A+(−B). Thus, comparing two registers can be accomplished by adding one operand and the negative of the other. The negation can be performed as part of the ALU or in a stage prior to the ALU. If one of the operands is a constant, the constant can be replaced with its negative at compilation time or in a post-processing step. To check if (A==10), for example, the processor could perform an addition of A and −10 and check to see if the result is zero.

Many operations that leverage an integer adder (such as adds, subtracts, increments, negates, etc) require a zero flag to be set or cleared depending on the adder result. If the adder result is zero, the zero flag is set. If the adder result is non-zero, the zero flag is cleared.

Figure 3:
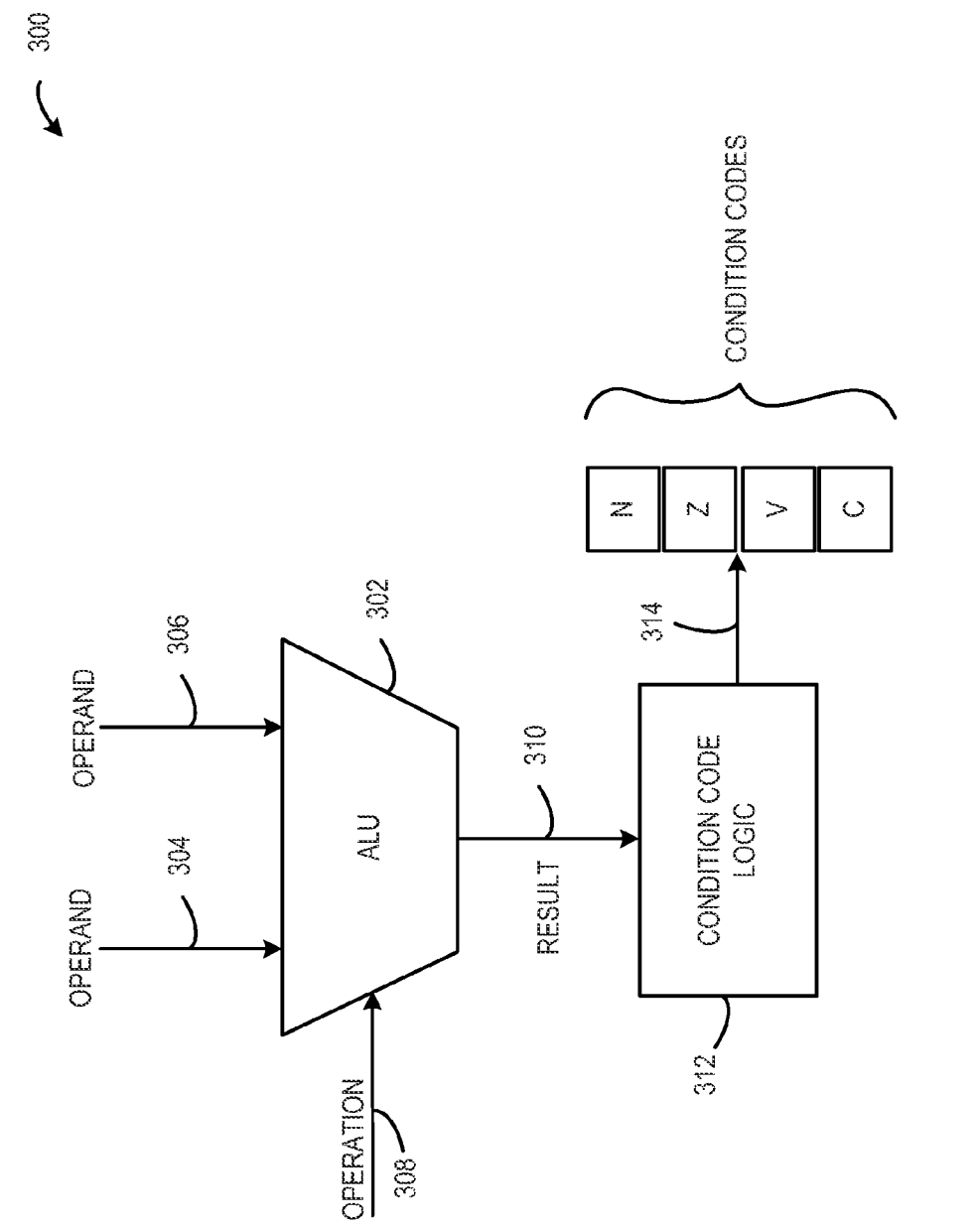
FIG. 3 shows a prior art execution logic circuit that determines a primary result and condition code in series.

FIG. 3 shows an example of a traditional configuration of an execution logic circuit or unit 300 that is configured to determine a condition code for an arithmetic operation, such as a zero flag. The depicted traditional configuration of the execution logic circuit 300 includes an ALU 302. In some embodiments, the ALU 302 is an adder circuit. The ALU 302 is configured to receive a first operand 304, a second operand 306, and an operation 308 for the ALU 302 to perform on the first operand 304 and the second operand 306. The ALU 302 outputs a result 310 of the operation 308. The result 310 is fed downstream serially to condition code logic 312. The condition code logic 312 processes the result 310 and outputs a condition code 314 that corresponds to the result 310. For example, flags are commonly set to indicate whether the result of an ALU operation was negative (N) or zero (Z) or resulted in a carry (C) or an overflow (V). In one particular example, the condition code logic 312 is a NOR tree that determines whether or not the result is zero, and outputs a zero flag. In this configuration, the total delay of the execution logic circuit 300 is equivalent to the delay through the ALU 302 (e.g., adder) plus the subsequent delay through the condition code logic 312 (e.g., NOR tree). When the execution logic circuit 300 is applied to a processing pipeline as described above, the delay associated with the execution logic circuit 300 may cause various hazards as described above.

To speed the generation of a condition code for an operation, such as the zero flag, various embodiments replace the serial configuration of execution logic circuit 300 with a parallel processing configuration.

Figure 4:
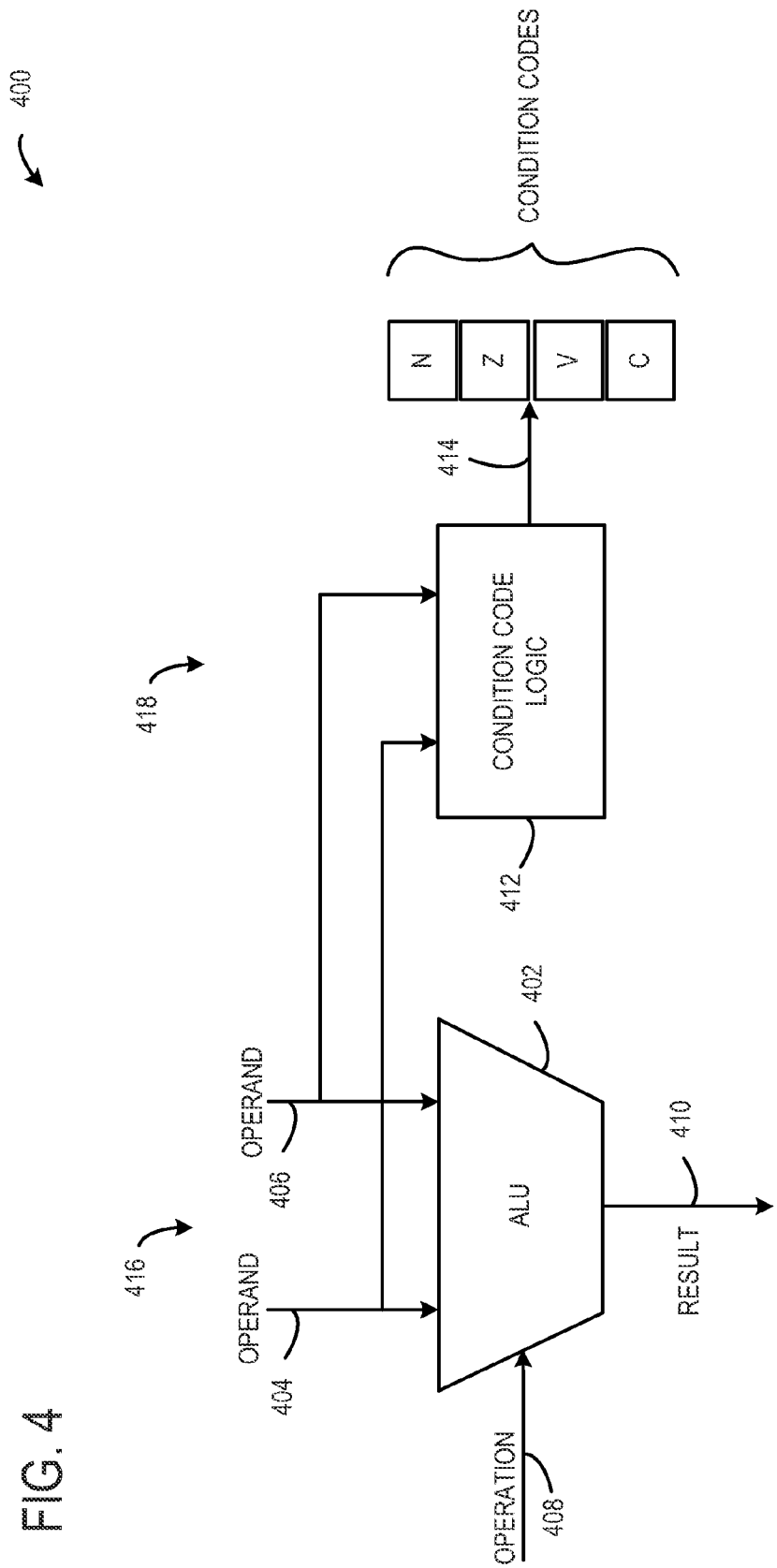
FIG. 4 shows an embodiment of an execution logic circuit that determines a primary result and condition code in parallel.

FIG. 4 shows an embodiment of an execution logic circuit or unit 400 configured to perform an arithmetic operation and determine a corresponding condition code in parallel. The execution logic circuit 400 includes a primary logic path 416 for performing an arithmetic operation on multiple operands and generating a primary result. In particular, the primary logic path 416 includes an ALU 402. The ALU 402 is configured to receive a first operand 404, a second operand 406, and an operation 408 for the ALU 402 to perform on the first operand 404 and the second operand 406. The ALU 402 outputs a primary result 410 of the operation 408.

The execution logic circuit 400 includes a parallel secondary logic path 418 for determining a characteristic associated with the result of the operation. In particular, the first operand 404 and the second operand 406 are supplied to the primary logic path 416 and the secondary logic path 418. In other words, the first operand 404 and the second operand 406 are supplied to the ALU 402 and condition code logic 412 at substantially the same time (e.g., same clock cycle). The first and second operands are supplied to the secondary logic path 418 (and more particularly the condition code logic 412) early enough to enable the secondary logic path to determine the characteristic 414 before or at least at the same time as the first logic path 416 generates the primary result 410. In one example, the characteristic 414 is determined before the primary result 410 is generated because the secondary logic path 418 has fewer logic stages than the first logic path 416. Additionally or alternatively, the secondary logic path 418 is configured to have a lower latency than the primary logic path 416. Accordingly, the characteristic 414 may be produced from the secondary logic path 418 at the same time or before the primary logic path 416 produces the result 410.

In some embodiments, the execution logic circuit 400 is configured to operate in a condition-only mode in which the primary logic path 416 is disabled. As discussed above, in some cases, the characteristic 414 is necessary to continue operation, whereas the result 410 does not affect operation. For example, the characteristic 414 may be used to determine a branch condition on which the primary result 410 has no bearing. In this example, the execution logic 400 may operate in the condition-only mode. By operating in the condition-only mode, power consumption may be reduced and performance may otherwise be enhanced.

In one example, the condition code logic 414 is configured to determine the characteristic 414 by calculating a "zero vector" in parallel with the ALU 402 calculating a result. Much like the adder result, this zero vector also has the property that when all values in the zero vector are zero, the zero flag is set. When it contains non-zero values, the zero flag is cleared. This zero vector, however, can be generated substantially faster than the adder result. The zero vector may then be sent through the NOR tree in lieu of the adder result. The total delay of this circuit is equivalent to the delay through the zero vector generator plus the subsequent delay of the NOR tree.

Figure 5:
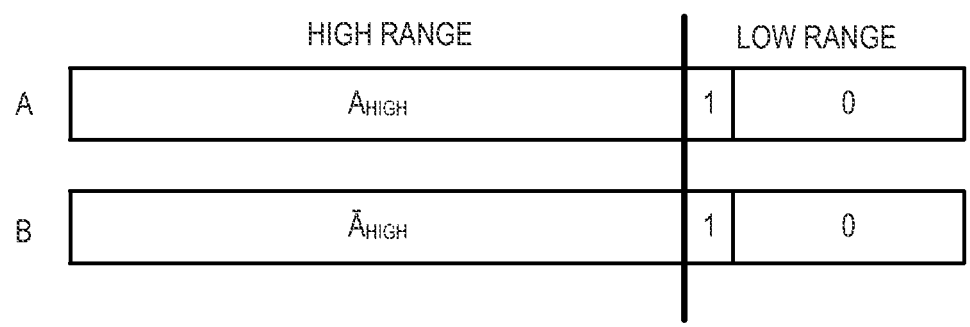
FIG. 5 shows an example of operands in a two's compliment format.
Figure 6:
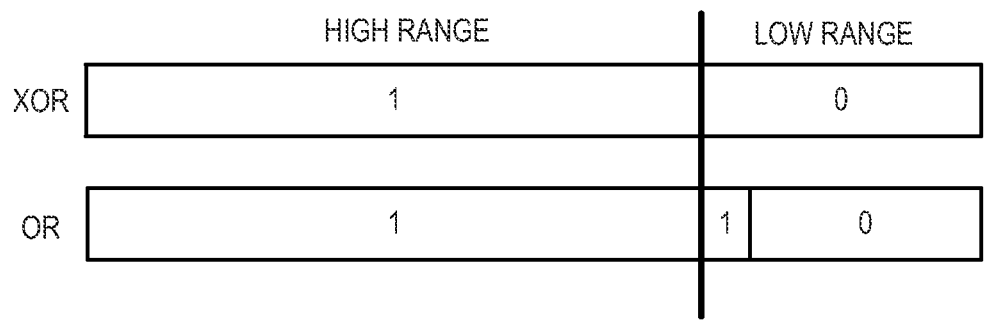
FIG. 6 shows an example of XOR and OR vectors of operands.

A helpful observation in implementing zero vector calculation is that for an adder result to be zero, the operands supplied to the adder must be two's complements of each other, assuming the operands are signed integers represented in two's complement format. FIGS. 5-6 show properties of example operand A and its two's complement B. These properties may be employed in calculating the zero vector.

In FIG. 5, let A be any integer and B be its two's complement. To generate B from A, A is inverted (denoted Â) and incremented by 1. The addition of 1 to Â ensures that there is a range of low-order bits of B that are equal to A (i.e., LOW RANGE). This range depends on how far the carry bit propagates during the increment of Â, but it is at least one bit wide, and can be the entire width (width meaning number of bits) of the operands (e.g., first operand 404, second operand 406). The most significant bit (MSB) of the LOW RANGE will typically be 1, but all other bits within this range will be 0. (Note there is one case when the MSB of the low range is not 1. This happens when A, and hence B, is 0. In this case the "low range" is zero for both A and B, and extends the entire width of the operands. There is no "high range" for this case.)

Continuing with the example shown in FIG. 5, all bits of B to the left of the LOW RANGE (i.e., the HIGH RANGE, which is more significant than the LOW RANGE in a conventional endian scheme), will still be equal to Â, as they are left unaffected by the propagation of the carry bit. Accordingly, calculation of the zero vector and determination of the zero flag may be reduced to the detection of the case where operands A and B of the adder conform to the format shown in FIG. 5.

FIG. 6 shows XOR and OR vectors which result from performing the exclusive or (XOR) and or (OR) operations on A and B, respectively. When A and B conform to the format of FIG. 5, an XOR of A and B yields a vector of all 1s in the HIGH RANGE, and all 0s in the LOW RANGE. Likewise, an OR of A and B yields a vector of all 1s in the HIGH RANGE, a 1 in the MSB of the LOW RANGE, and all 0s in all other bits of the LOW RANGE. Note that A and B do not need to be two's complements to produce the XOR vector of FIG. 6, nor do A and B need to be two's complements to produce the OR vector of FIG. 6. They do need to be two's complements to produce both the XOR and OR vectors of FIG. 6. Thus, calculation of the zero flag may be reduced to the detection of the XOR and OR vectors of FIG. 6.

Figure 7:
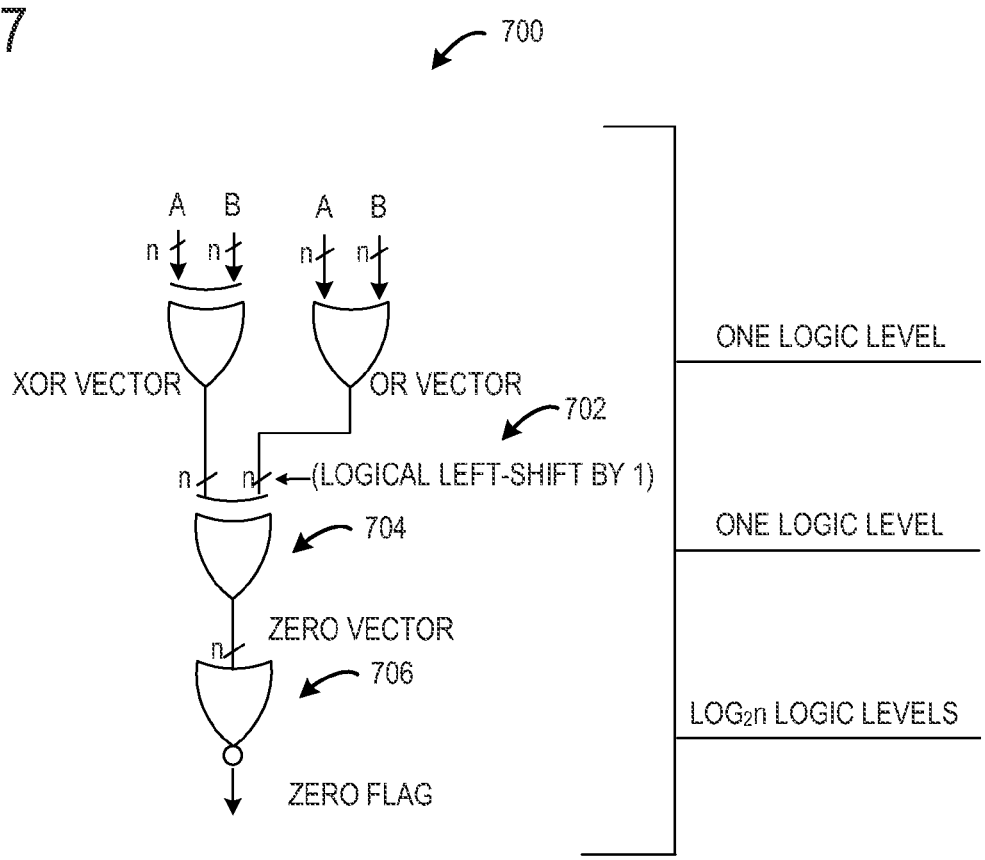
FIG. 7 shows an embodiment of a logical structure of a secondary logic path of the execution logic circuit of FIG. 4.

FIG. 7 shows an embodiment of a logical structure 700 for detecting a zero flag that may be employed in the condition code logic 412 of the execution logic circuit 400 shown in FIG. 4. In order to detect the case where the XOR and OR vectors simultaneously conform to the format shown in FIG. 6, the OR vector is logical left-shifted by 1 at 702. The result of the logical left-shift of the OR vector by 1 is equal to the XOR vector. Taking the XOR of the XOR vector with the logical left-shifted by 1 OR vector at 704 then results in a zero vector that is zero only when the XOR and OR vectors both conform to the format shown in FIG. 6. Correspondingly, the characteristic is non-zero when the XOR and OR vectors do not conform. In other words, the zero vector is zero only when A and B are two's complements of each other. The zero vector is sent through a NOR tree at 706 to generate the zero flag.

It should be noted that the logical structure 700 and corresponding method for determining the zero flag is independent of the ALU 402 and corresponding operations to compute the result 410. Rather, the logical structure 700 may be employed in the secondary logic path 418 that operates in parallel with the ALU 402. Accordingly, in various embodiments, the ALU 402 may employ a ripple carry adder, a carry look-ahead adder, or any other suitable circuit to compute the sum of the operands.

To compare the delay of the secondary logical path 418, and more particularly the logical structure 700 with the traditional configuration shown in FIG. 3, in more detail, notice that a standard N-bit carry look-ahead adder (CLA) operates in log N levels of logic. This is often followed by an XOR to generate the final sum. This sum is then sent through an N-bit NOR tree, again with log N levels of logic to generate the zero flag. The minimum number of logic levels required to generate the zero flag from the source operands is therefore 1+2 log N. As one example, for a 64-bit adder, this results in 13 levels of logic.

In the logic structure 700, the 1+log N levels of logic in the adder may be replaced by a constant 2 levels of logic according to the present disclosure. Thus, the total number of logic levels may be 2+log N, which in the example of 64-bit operands reduces to 8 levels, or a speedup of approximately 40% (as applied to first order logic level counts) when compared to traditional approaches.

Figure 8:
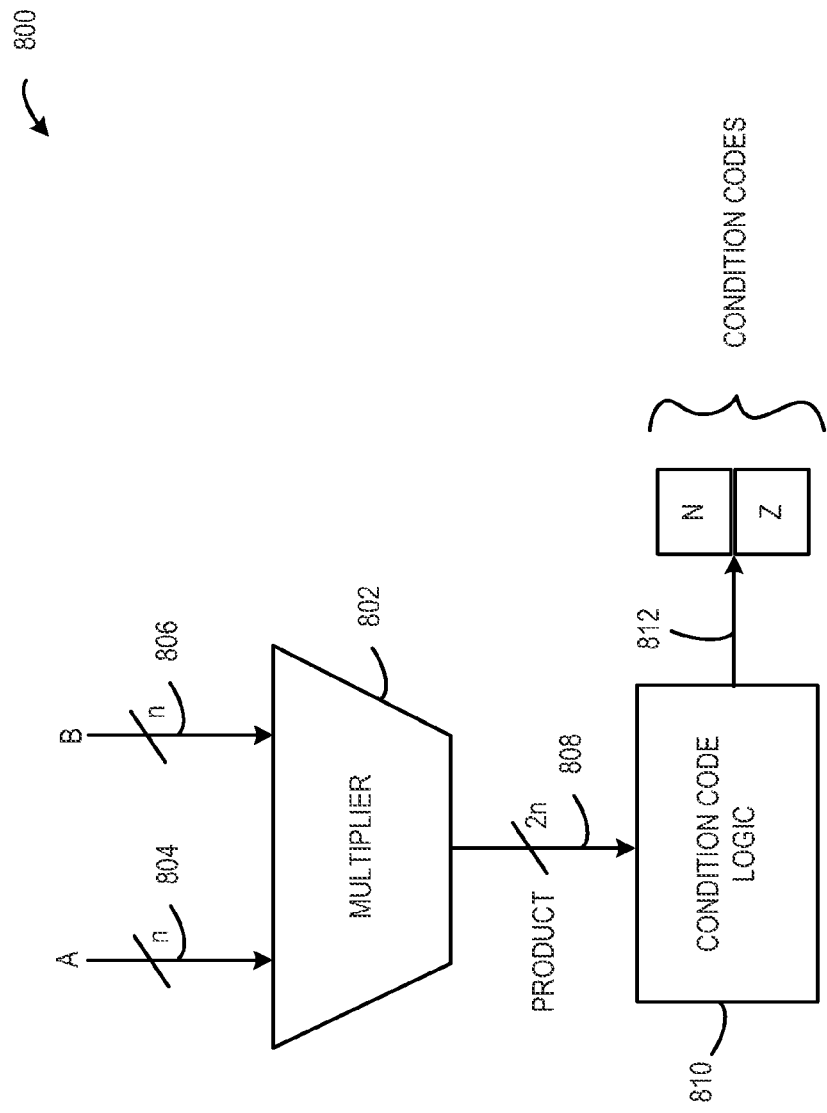
FIG. 8 shows a prior art multiplier logic circuit that determines a product and a zero flag condition in series.

FIG. 8 shows an example of a traditional configuration of execution logic circuit or unit 800 that is configured to determine a result and a condition code for a multiply operation. The traditional configuration of the execution logic circuit 800 includes a multiplier logic unit 802. The multiplier 802 is configured to receive a first operand 804 and a second operand 806. The multiplier 802 outputs a product 808 of the first operand 804 and the second operand 806. The product 808 is sent downstream to condition code logic 810. The condition code logic 810 processes the product 808 and outputs a condition code 812 that corresponds to the product 810. For example, many operations that leverage an integer multiplier (e.g., signed and unsigned multiplies) require a zero condition code (flag) to be set or cleared depending upon the product output by the multiplier. If the product is zero, the flag is set. If the product is non-zero, the zero flag is cleared.

Some instruction set architectures provide instructions for multiplying n-bit numbers (e.g., first operand 804 and second operand 806) where the results are not full 2n-bit products but rather just the least significant n-bits of the full 2n-bit product. The most significant n-bits of the full 2n-bit product are ignored. This complicates zero detection as the zero flag cannot be set or cleared by simply comparing the operands with zero. There are cases where neither operand is zero, yet the least significant n-bits of the product are zero, which requires that the zero flag be set.

In one example, a traditional configuration of the condition code logic 810 includes a zero detection circuit such as a NOR tree, and the output from the multiplier is sent through the NOR tree to calculate the zero flag. In this configuration, the total delay of the circuit is the sum of the delay of the multiplier and the delay of the zero detection circuit, assumed here to be a NOR tree.

To speed the generation of the zero flag for the product of the multiplier, various embodiments replace the serial configuration of execution logic circuit 800 with a parallel configuration.

Figure 9:
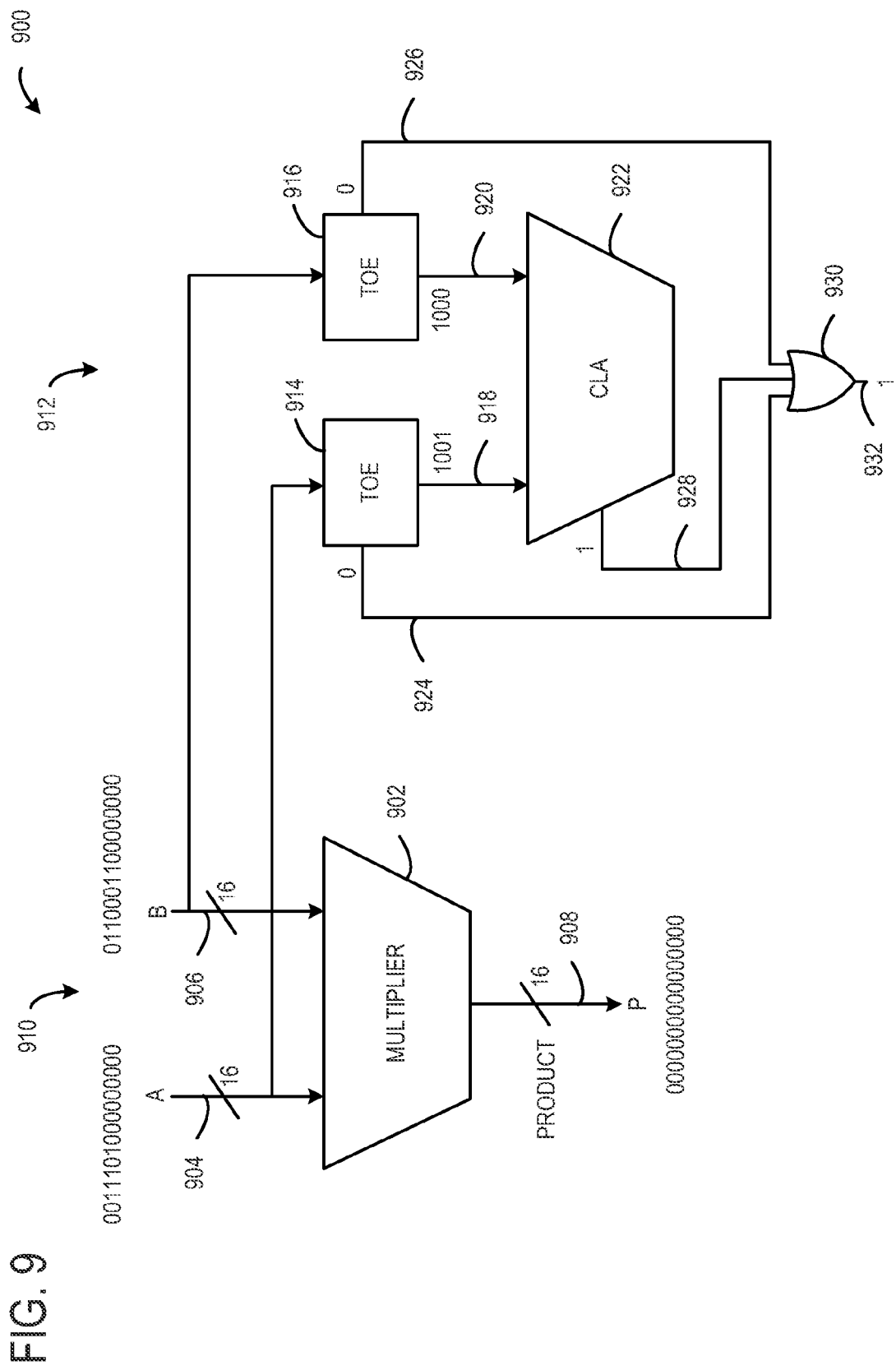
FIG. 9 shows an embodiment of a multiplier logic circuit that determines a primary result and a zero flag condition in parallel.

FIG. 9 shows an embodiment of execution logic circuit or unit 900 that is configured to perform a multiply operation and calculate a zero flag condition in parallel. The execution logic circuit 900 includes a primary logic path 910 that includes a multiplier 902 for performing a multiply operation on a first operand 904 and a second operand 906, and outputting a product 908. In the illustrated embodiment, the first and second operands and the product are 16 bit integers.

The execution logic circuit 900 includes a parallel secondary logic path 912 that is configured to predict the number of trailing zeros (0 to 2n) of the primary product result 908. If the number of trailing zeros is greater than or equal to n, then the n-bit product is zero and the zero flag is set. If the number of trailing zeros is less than n, then the n-bit product is non-zero and the zero flag is cleared. This is based on the observation that the number of trailing zeros of a 2n-bit result is the sum of the number of trailing zeros in the two operands used to generate the result. In the illustrated embodiment, consider the two operands A and B and their product P. If the number of trailing zeros of A is denoted a, and the number of trailing zeros of B is denoted b, then the number of trailing zeros of the product P is p, where p=a+b. When p≥n, the zero flag is set. When p<n, the zero flag is cleared.

In one example, a trailing one encoder (TOE) circuit determines and encodes the position of the least significant one in an n-bit value. The position may be encoded as any value between and including 0 and n-1 (where the least significant bit is bit 0 and the most significant bit is bit n-1). This position may be encoded in log n bits. If the n-bit value contains only zeros, then a "value is zero" signal is generated. The encoded value is equivalent to the number of trailing zeros in the n-bit value. A TOE circuit can be built in log n levels of logic.

In the illustrated embodiment, a first TOE circuit 914 performs a trailing one encode on the first operand 904 and a second TOE circuit 916 performs a trailing one encode on the second operand 906. If either of the TOE circuits 914 or 916 signals "value is zero" then a zero output 924/926 is set by the first TOE circuit 914 or the second TOE circuit 926, respectively. If neither of the TOE circuit signals "value is zero" then the encoded values 918/920 from each of the TOE circuits 914/916 are passed to a (log n)-bit carry look-ahead (CLA) circuit 922 that produces a carry out value 928. In this example, a full carry look-ahead adder is not needed, as only the carry out value is required for the zero flag determination. If the carry out value 928 is set then the number of trailing zeros of the product is greater than or equal to n, and the zero flag is set. In particular, the zero output 924 of the first TOE circuit 914, the zero output 926 of the second TOE circuit 916, and the carry out value 928 are supplied to an OR gate 930 that generates the zero flag 932. A log n bit carry look-ahead can be performed in log (log n) levels of logic.

In the illustrated embodiment, two non-zero unsigned integer operands, A and B are provided to both the primary logic path 910 and the secondary logic path 912 at the same time. The first TOE circuit 914 with input A generates binary number 1001 (corresponding to 9, the number of trailing zeros present in the A operand) while the second TOE circuit 916 with input B generates binary number 1000 (corresponding to 8, the number of trailing zeros present in the B operand). Both the first and second TOE circuits generate a 0 on their zero outputs 924/926 because neither operand is equal to zero.

The outputs of the TOE circuits 918/920 are provided to the carry-look ahead circuit (CLA) 922 solely to determine whether there is a carry from the addition of the two TOE values. In this case, there is a carry (9+8>15), meaning that there will be at least 16 trailing zeros in the 16-bit product. Thus, the carry out value 928 is set to 1, and the zero flag 932 is set.

Note that although unsigned integer operands are utilized in the above described example, it should be appreciated that the above described fast generation scheme is applicable to both signed and unsigned operands.

While the above described example employs 16-bit operands, other applications may employ 64-bit or other size operands. In a 64-bit operand configuration of the execution logic circuit 900, there are 6 levels of logic in the TOE circuits 914/916, 3 levels of logic in the CLA 922, and 1 level of logic in the OR gate 930, for a total logic depth of 10. Accordingly, the execution logic circuit 900 has significantly less logic than the traditional execution logic circuit 800, which has a 64-bit multiplier followed by a NOR tree of depth 6. Moreover, due to the parallel logic paths and the reduced logic depth, the execution logic circuit 900 may provide a zero flag more quickly than traditional configurations. In this way processing performance may be enhanced.

Figure 10:
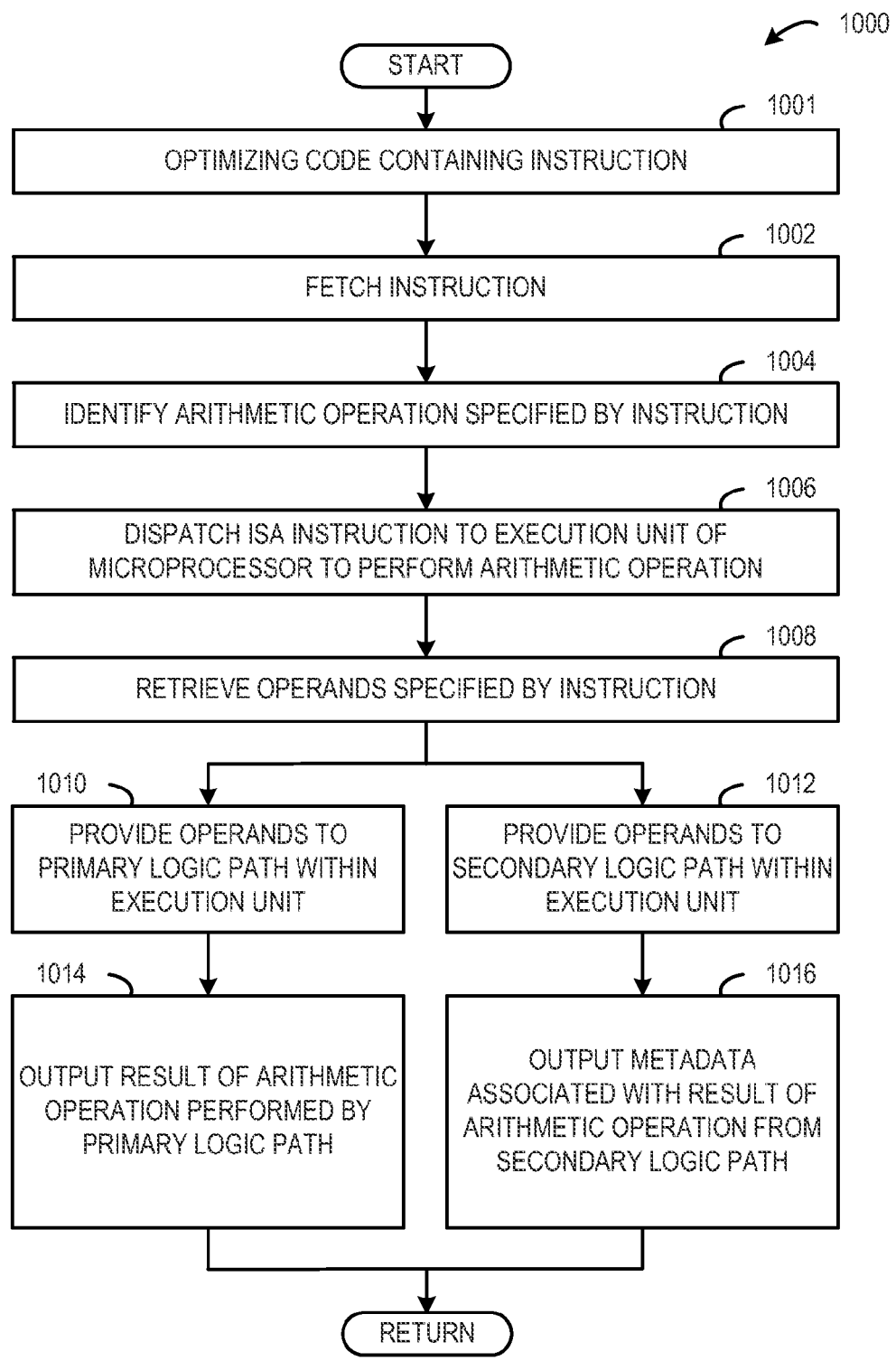
FIG. 10 shows an embodiment of a method for executing ISA instructions to quickly generate a result characteristic determination for an arithmetic operation.

FIG. 10 shows a method 1000 for executing instructions to quickly generate a code condition/designated characteristic/metadata associated with an arithmetic operation. In one example, the method 1000 may be executed by the microprocessor 100 shown in FIG. 1. As another example, the method 1000 may be executed by the processing pipeline 200 shown in FIG. 2.

At 1001, the method 1000 includes optimizing code containing an instruction. In some implementations, the instruction is an ISA instruction. The optimization may be performed in software. The software optimization may be performed prior to fetching of the ISA instruction. In some embodiments, the software optimization is performed using a VLIW strategy. In some embodiments, the software optimization is performed using a code-morphing strategy.

At 1002, the method 100 includes fetching an instruction. In one example, the fetch logic 120 shown in FIG. 1 fetches the instruction.

At 1004, the method 1000 includes decoding the instruction to identify an arithmetic operation specified by the instruction. In one example, the decode logic 122 shown in FIG. 1 decodes the instruction. In some embodiments, the instruction is an add, a subtract, a decrement, an increment, or a compare instruction.

At 1006, the method 1000 includes dispatching the instruction to an execution unit of the microprocessor that is configured to perform the arithmetic operation. In one example, the instruction is dispatched to the execution logic circuit 400 shown in FIG. 4. In another example, if the operation is a multiply operation, the instruction is dispatched to the execution logic circuit 900 shown in FIG. 9.

At 1008, the method 1000 includes retrieving operands specified by the instruction. In one example, the execution logic circuit 400 shown in FIG. 4 retrieves the operands specified by the instruction. In some embodiments, the operands are signed integers represented in two's complement format. In some embodiments, the operands are n-bit integers.

At 1010, the method 1000 includes providing the operands to a primary logic path within the execution unit. In one example, the operands are provided to the primary logic path 416 of the execution logic circuit 400 shown in FIG. 4.

At 1012, the method 1000 includes providing the operands to a secondary logic path within the execution unit. In one example, the operands are provided to the secondary logic path 418 of the execution logic circuit 400 shown in FIG. 4. The operands may be provided to the first and second logic paths, so that each logic path may perform operations in parallel. In some cases, the operands may be provided to the primary logic path and the secondary logic path at substantially the same time.

At 1014, the method 1000 includes outputting a result of the arithmetic operation performed by the primary logic path.

At 1016, the method 1000 includes outputting, via operation of the secondary logic path, a designated characteristic associated with a result of the arithmetic operation. Stated another way, the method 1000 includes outputting metadata associated with the result of the arithmetic operation from the secondary logic path. The determination of the designated characteristic/metadata is completed within a time interval to complete the arithmetic operation. In some cases, the metadata is output at substantially the same time or prior to the result of the arithmetic operation is output.

By determining the characteristic of the result of the operation in parallel with the operation, generation of the characteristic can be significantly sped up relative to traditional serial result and characteristic generation methods. One advantage of this approach is that it allows faster clock rates. For example, in a serial approach, if a critical path of a processor is directed through the serial logic, then the frequency of the clock would have to be reduced to accommodate the serial operation. In contrast to the serial approach, by determining the result and associated characteristics in parallel, both operations can be completed in a shorter amount of time. As such, the clock frequency can be increased relative to that of the serial approach. In this manner, overall instruction and system performance can be increased.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples as understood by those of ordinary skill in the art. Such other examples are intended to be within the scope of the claims.

The invention claimed is:

1. A microprocessor, comprising:
fetch logic for retrieving an instruction;
decode logic configured to identify a plurality of operands and a multiply operation specified in the instruction; and
execution logic configured to receive the plurality of operands and the multiply operation, the execution logic including:
a first logic path configured to perform the multiply operation on the plurality of operands and output a result; and
a second logic path, arranged in parallel with the first logic path, configured to output metadata associated with the result of the multiply operation, where the metadata includes at least one condition code, and wherein the second logic path includes:
a first encoder operable to perform a trailing-one encode operation on a first operand of the plurality of operands and output a first zero value indicating whether the first operand is zero or non-zero and a first encoded value representative of a number of trailing zeros in the first operand;
a second encoder operable to perform a trailing-one encode operation on a second operand of the plurality of operands and output a second zero value indicating whether the second operand is zero or non zero and a second encoded value representative of a number of trailing zeros in the second operand;
a carry look-ahead adder operable to receive the first encoded value and the second encoded value and output a carry out value indicating whether or not the number of trailing zeros of the result is greater than or equal to n; and
a logic gate operable to receive the first zero value, the second zero value, and the carry out value and output a zero flag indicating whether the result is zero or non-zero.

2. The microprocessor of claim 1, where the microprocessor is configured so that the plurality of operands are provided to both the first logic path and the second logic path at substantially the same time.

3. The microprocessor of claim 1, where the metadata indicates whether the result is zero or non-zero.

4. The microprocessor of claim 2, where the second logic path is configured to output the metadata associated with the result of the multiply operation at least as early as the first logic path outputs the result of the multiply operation.

5. The microprocessor of claim 1, where the plurality of operands includes two n-bit integers, the first logic path is configured to multiply the two n-bit integers to produce a 2n-bit product, the result is a lower n-bits of the 2n-bit product, and the second logic path is configured to determine whether the lower n-bits are zero or nonzero.

6. The microprocessor of claim 5, where the second logic path is configured to determine that the result is zero if a number of trailing zeros in the result is greater than or equal to n and determine that the result is non-zero if the number of trailing zeros in the result is less than n.

7. An execution unit configured to receive a plurality of operands comprising:
　a first logic path configured to perform a multiply operation on the plurality of operands and output a result; and
　a second logic path, arranged in parallel with the first logic path, configured to output metadata associated with the result, where the plurality of operands are supplied to the second logic path early enough to enable the second logic path to output the metadata at substantially the same time or before the first logic path outputs the result, and where the metadata includes at least one condition code, wherein the second logic path includes:
　　a first encoder operable to perform a trailing-one encode operation on a first operand of the plurality of operands and output a first zero value indicating whether the first operand is zero or non-zero and a first encoded value representative of a number of trailing zeros in the first operand;
　　a second encoder operable to perform a trailing-one encode operation on a second operand of the plurality of operands and output a second zero value indicating whether the second operand is zero or non zero and a second encoded value representative of a number of trailing zeros in the second operand;
　　a carry look-ahead adder operable to receive the first encoded value and the second encoded value and output a carry out value indicating whether or not the number of trailing zeros of the result is greater than or equal to n; and
　　a logic gate operable to receive the first zero value, the second zero value, and the carry out value and output a zero flag indicating whether the result is zero or non-zero.

8. The execution unit of claim 7, where the plurality of operands are provided to both the first logic path and the second logic path at substantially the same time.

9. The execution unit of claim 7, where the metadata includes a zero flag that indicates whether the result is zero or non-zero.

10. The execution unit of claim 9, where the plurality of operands includes two n-bit integers, the first logic path is configured to multiply the two n-bit integers to produce a 2n-bit product and the result is a lower n-bits of the 2n-bit product, and the second logic path is configured to determine that the result is zero if a number of trailing zeros in the result is greater than or equal to n and determine that the result is non-zero if the number of trailing zeros in the result is less than n.

* * * * *